(12) United States Patent
Presley

(10) Patent No.: US 6,540,278 B2
(45) Date of Patent: Apr. 1, 2003

(54) TRANSLATABLE LOAD PANEL

(75) Inventor: William T Presley, Macomb Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/026,217

(22) Filed: Dec. 20, 2001

(65) Prior Publication Data

US 2002/0074818 A1 Jun. 20, 2002

Related U.S. Application Data

(60) Provisional application No. 60/257,140, filed on Dec. 20, 2000.

(51) Int. Cl.$^7$ ............................. B62D 33/03; B60J 5/10
(52) U.S. Cl. .................. 296/57.1; 296/106; 296/146.8; 296/26.11
(58) Field of Search ............................... 296/57.1, 106, 296/146.8, 26.11

(56) References Cited

U.S. PATENT DOCUMENTS

| | | | | |
|---|---|---|---|---|
| 1,895,325 A | * | 1/1933 | Herbert | 296/57.1 |
| 4,763,945 A | * | 8/1988 | Murray | 296/57.1 |
| 5,188,415 A | * | 2/1993 | Wagner | 296/57.1 |
| 5,664,822 A | * | 9/1997 | Rosenfield | 296/39.2 |
| 5,904,391 A | * | 5/1999 | Liljenquest et al. | 296/57.1 |
| 6,293,602 B1 | | 9/2001 | Presley | |
| 6,367,858 B1 | * | 4/2002 | Bradford | 296/26.09 |

* cited by examiner

*Primary Examiner*—Hilary T. Gutman
*Assistant Examiner*—H. Gutman
(74) *Attorney, Agent, or Firm*—Edwin W. Bacon, Jr.

(57) ABSTRACT

A tailgate for a vehicle has an aperture formed therein. A panel member extends through the aperture and is pivotably coupled to the vehicle body. The panel member is arranged to simultaneously pivot relative to the vehicle body and slide relative to the tailgate as the tailgate is opened and closed. This allows the panel member to remain in a position covering at least a portion of a gap between the vehicle body and the tailgate, even when the tailgate is an open position.

6 Claims, 3 Drawing Sheets

TRANSLATABLE LOAD PANEL

CROSS-REFERENCE TO RELATED APPLICATIONS

This application claims the benefit of U.S. Provisional Patent Application Ser. No. 60/257,140 filed on Dec. 20, 2000.

BACKGROUND OF THE INVENTION

1. Field of the Invention

The present invention relates generally to hinged closure panels, such as a tailgate, for motor vehicles, and more particularly, to an arrangement operable for substantially covering a gap between the closure panel and the vehicle body when the panel is placed in an opened or lowered position.

2. Background Art

It is well known in the art to provide a vehicle, such as a pick-up truck, with a pivotable closure panel/tailgate that can be operated to selectively enclose a bed or storage compartment on the vehicle. Tailgates are typically attached to the body of a vehicle for rotation about a horizontal pivot axis at an edge of the tailgate. Such arrangements also position the tailgate relative to the vehicle body so as to maintain a relatively small gap or clearance between the tailgate and vehicle to minimize potential interference with operation, i.e., raising and lowering, of the tailgate.

However, the provision of such a clearance/gap can limit flexibility in configuration of the vehicle with respect to the tailgate and other components of the vehicle body such as a rear bumper. For example, if a relatively large (i.e., deep) bumper was desired, the bumper would typically be positioned below the location of the lowered tailgate so as to avoid the possibility of interference between the tailgate and the bumper. Designs of this type, however, allow the hinge line of the tailgate to be viewed as well as limit flexibility in the vertical positioning of the bumper.

A gooseneck-type hinge can be employed to couple the tailgate to the vehicle body where the bumper is configured or positioned in a manner that interferes with operation of the tailgate. However, this approach, swings the tailgate away from the bed or floor of the vehicle as the tailgate is lowered and causes a large gap between the tailgate and the bed or floor of the vehicle. Large gaps between the tailgate and the bed or floor of the vehicle are typically undesired.

One known approach is disclosed in commonly assigned U.S. Pat. No. 6,293,602 entitled "Sliding Tailgate Panel", the disclosure of which is hereby incorporated by reference as if fully set forth herein. Although this approach is effective, a need exists for a less complex configuration.

SUMMARY OF THE INVENTION

In accordance with a first aspect of the present invention, a tailgate is provided for a vehicle body including a closure member having a generally hollow interior, an aperture formed in the closure member, and a support mounted in the hollow interior. A panel member is provided having a portion thereof extending through the aperture and pivotably coupled to the vehicle body. The panel member is slidably supported by the support so that the panel member pivots relative to the vehicle body causing the panel member to slide within the aperture when the tailgate is moved to an open or closed position. The panel member is attached to the vehicle body so as to cover at least a portion of a gap between the vehicle body and the closure member.

In accordance with another aspect of the present invention, a vehicle is provided with a closure panel arrangement for enclosing a portion or aperture of a vehicle body. The closure panel arrangement includes a closure member having a generally hollow interior and a panel aperture formed in a surface thereof. A hinge pivotably couples the closure member to the vehicle body so that the closure member is movable between a first position substantially enclosing the body aperture and a second position allowing the aperture to be open. The hinge arranged to position the closure member in spaced relationship with the vehicle body. A panel member extends through the panel aperture and is pivotably coupled to the vehicle body. The panel member simultaneously pivoting relative to the vehicle body and sliding relative to the closure member in response to movement of the closure member between the first and second positions, so that the panel member covers the space between the vehicle body and the closure member when the closure member is in the second position.

These and other aspects, features, and advantages of the present invention will be readily apparent from the following detailed description of the preferred embodiment(s) when taken in connection with the accompanying drawings.

DETAILED DESCRIPTION OF THE PREFERRED EMBODIMENT

Figure 1:
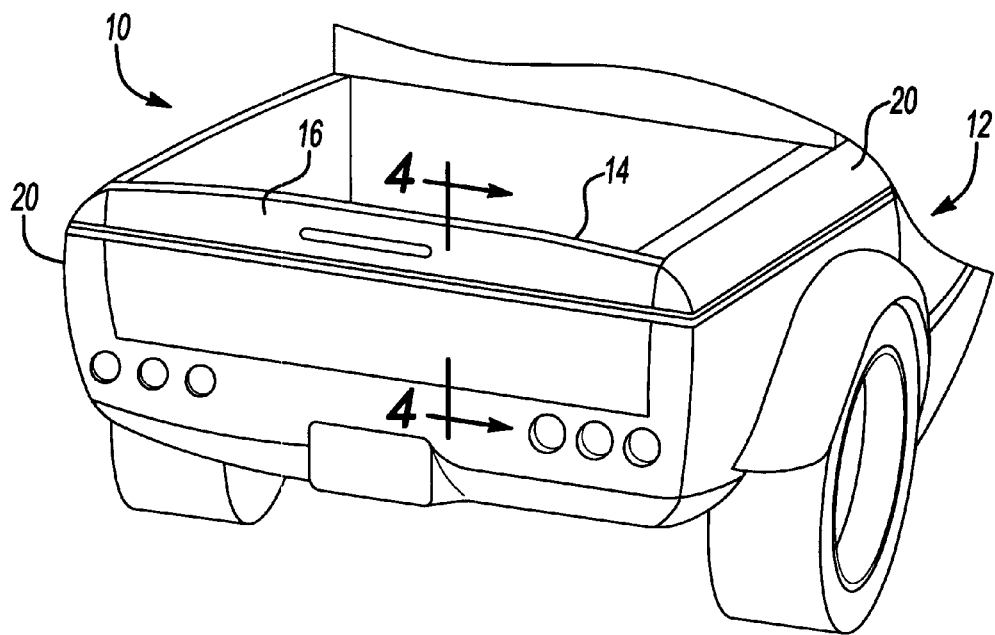
FIG. 1 is a perspective view of a vehicle having a tailgate assembly constructed in accordance with the teachings of the present invention.
Figure 2:
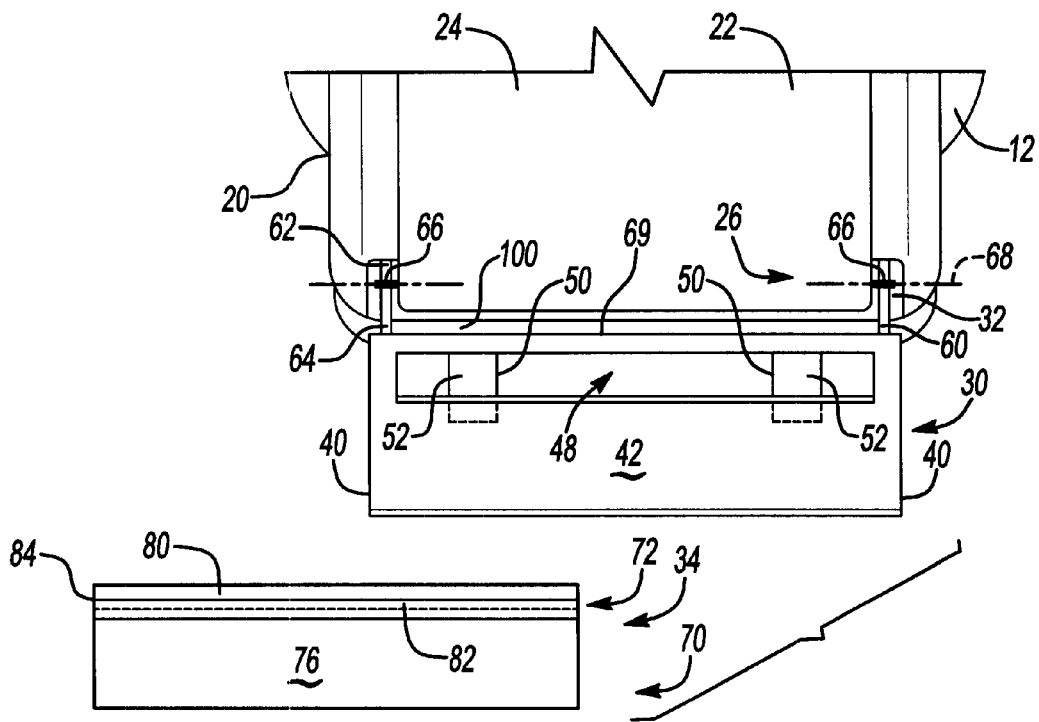
FIG. 2 is a top view of a portion of the vehicle of FIG. 1 illustrating the tailgate structure in a lowered position and the panel assembly exploded from the tailgate structure.
Figure 3:
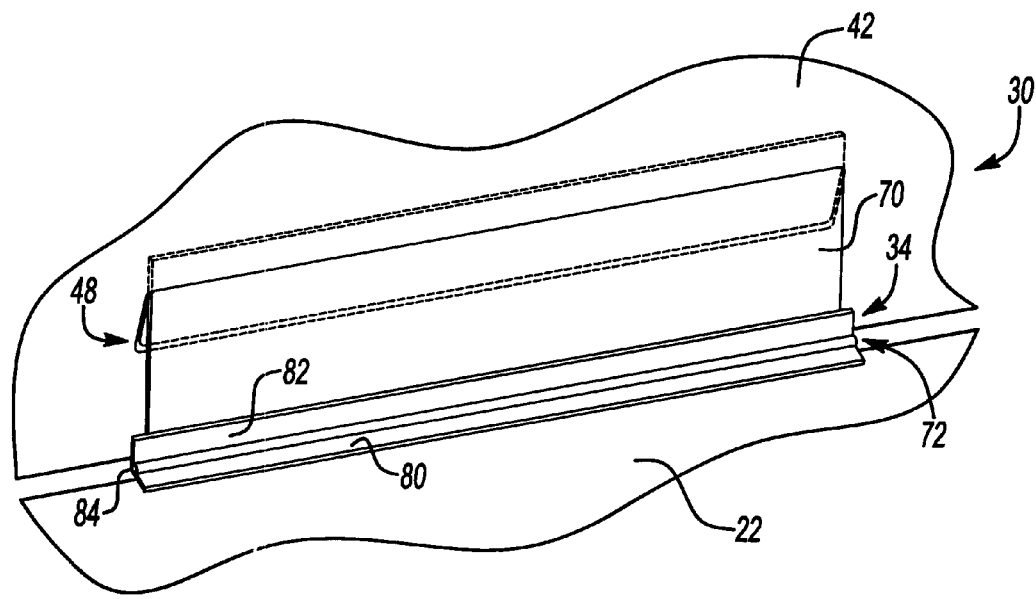
FIG. 3 is a perspective view of a portion of the vehicle of FIG. 1 illustrating the panel assembly when the tailgate assembly is in the raised position.

With reference to FIGS. 1 and 2 of the drawings, a vehicle 10 is shown incorporating a closure panel arrangement in accordance with the teachings of the present invention. As will be discussed in greater detail below, vehicle 10 includes a vehicle body 12 and a closure panel/member 14, such as a tailgate assembly 16, that may be rotated between a raised/closed position as illustrated in FIG. 1 and a lowered/opened position as illustrated in FIG. 2. Although the particular vehicle illustrated is a pick-up truck, it will be understood that the teachings of the present invention have applicability to other types of vehicles, including but not limited to sport utility vehicles, minivans, station wagons and other vehicles having a pivoting tailgate arrangement.

Vehicle body 12 includes a bed 24 formed by laterally spaced side walls 20 connected by a generally horizontal floor 22. The side walls and floor are arranged to define a box structure having an open end or bed aperture 26 formed at the rearward end of the bed 24.

Figure 4:
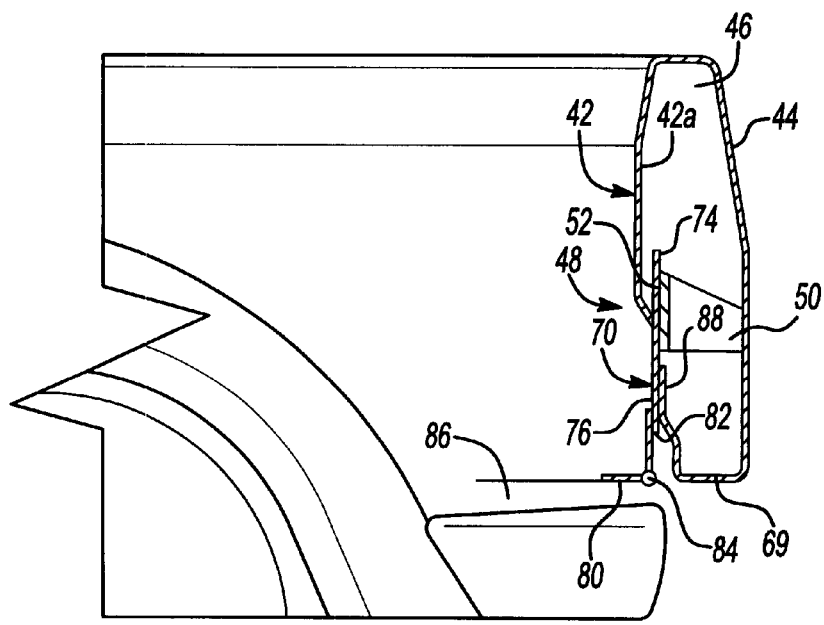
FIG. 4 is a cross-sectional view taken along the line 4—4 of FIG. 1.

As best seen in FIGS. 2 and 4, tailgate assembly 16 includes a tailgate structure 30, a mounting hinge 32 and a panel assembly 34. Tailgate structure 30 includes a pair of lateral members 40, an inner panel member 42 and an outer panel member 44 that are coupled to one another to form a container-like structure having a generally hollow interior 46. A panel aperture 48 that is sized to receive a portion of panel assembly 34 is formed through the inner panel member 42.

Tailgate structure 30 also includes a pair of panel supports 50. Each of the panel supports 50 is coupled to the outer panel member 44 and includes a generally flat support surface 52 that is parallel to and spaced apart from the inner panel member 42. The support surface 52 of the panel supports 50 lies inside the hollow interior 46 of the tailgate structure 30 proximate the panel aperture 48.

The mounting hinge 32 is conventional in that it includes a pair of hinge assemblies 60, each assembly having a first hinge member 62, a second hinge member 64 and a pivot pin 66. The first hinge member 62 is coupled to the vehicle body 12, the second hinge member 64 is coupled to the tailgate structure 30 and the pivot pin 66 pivotably couples the first and second hinge members 62 and 64, permitting the tailgate structure 30 to be pivoted relative to the vehicle body 12 about a pivot axis 68 defined by the pivot pins 66. In the particular embodiment illustrated, the pivot axis 68 is shown to be spaced apart from the lower edge 69 of the tailgate structure 30.

The panel assembly 34 includes a panel member 70 and a connecting hinge 72. The panel member 70 is a generally planar member that is sized to slide through the panel aperture 48 and into the hollow interior 46 of the tailgate structure 30. The rearward side 74 of the panel member 70 is supported on the support surfaces 52 of the panel supports 50 such that the forward side 76 of the panel member 70 is almost adjacent to the rearward side 42a of the inner panel member 42.

The connecting hinge 72 includes first and second hinge leaves 80 and 82, respectively, that are pivotably connected via a hinge pin 84. The first hinge leaf 80 is fixedly coupled to the vehicle body 12 proximate a lower edge 86 of the bed 24. The second hinge leaf 82 is fixedly coupled to the lower edge 88 of the panel member 70. Accordingly, the lower edge 88 of the panel member 70 can pivot relative to the bed 24 but cannot translate relative to the bed 24.

Figure 5:
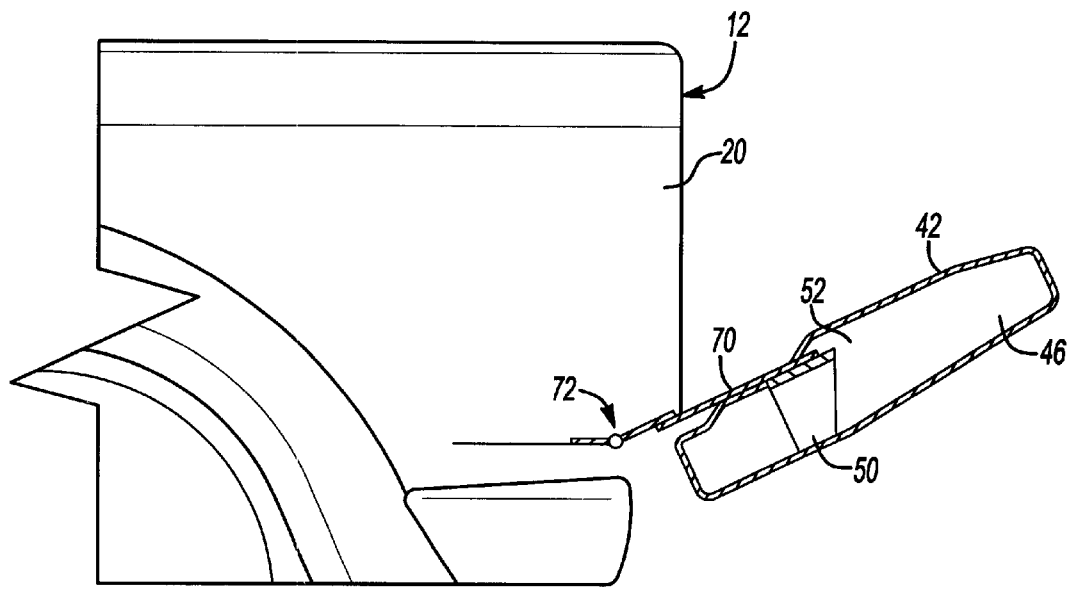
FIG. 5 is a cross-sectional view similar to that of FIG. 4 but illustrating the panel assembly when the tailgate assembly is being lowered.
Figure 6:
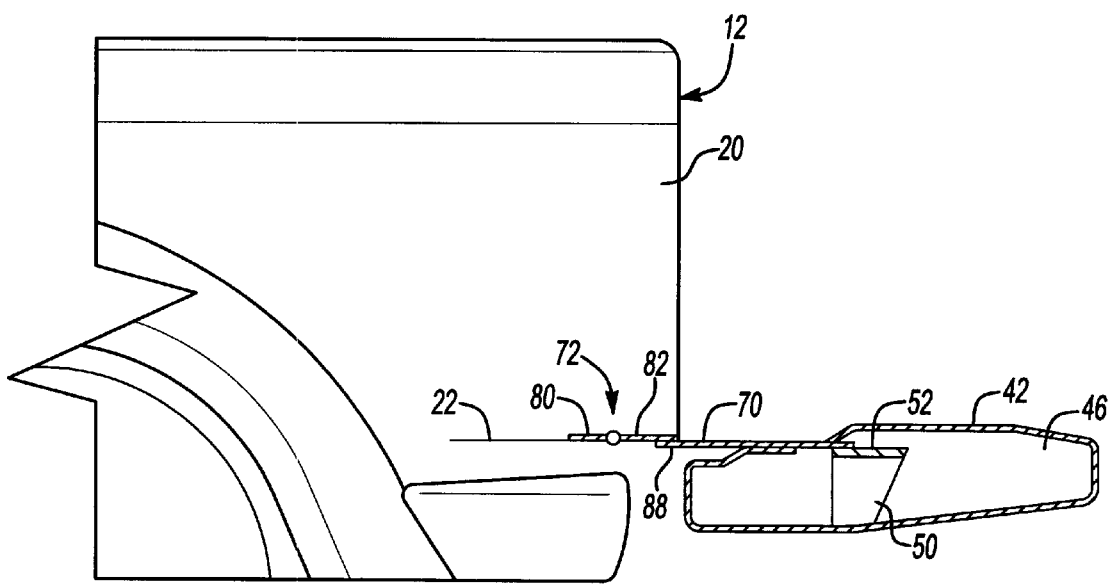
FIG. 6 is a cross-sectional view similar to that of FIG. 3 but illustrating the panel assembly when the tailgate assembly is in the lowered position.

In FIGS. 4 through 6, the operation of the tailgate assembly 16 is illustrated. When the tailgate assembly 16 is placed in the raised position as shown in FIG. 4, the panel member 70 is rotated into an almost vertical position and extends upwardly from the bed 24 slightly skewed to the inner panel member 42. In this retracted position, a substantial portion of the panel member 70 is stored within the hollow interior 46 of the tailgate structure 30.

When the tailgate assembly 16 is lowered, the configuration of the mounting hinge 32 causes the tailgate structure 30 to translate rearwardly of the bed 24 as the tailgate structure 30 pivots downward. The relatively large gap 100 (FIG. 2) between the tailgate structure 30 and the bed 24 is covered by the panel member 70. As mentioned above, the lower edge 88 of the panel member 70 cannot translate relative to the bed 24. Accordingly, when the tailgate structure 30 translates rearwardly as it is lowered, the panel member 70 slides outwardly from the tailgate structure 30 to cover the gap 100. The lower edge 69 of the tailgate structure 30 and the panel supports 50 support the panel member 70 in both the retracted position (FIG. 4) and the extended position (FIG. 6).

Those skilled in the art will understand that in pivoting the tailgate structure 30 from the lowered position to the raised position will cause the tailgate structure 30 to translate forwardly relative to the vehicle body 12 as it rotates. As such, the panel member 70 will slide from the extended position to the retracted position as pivots from a generally horizontal position to a generally vertical position.

While one or more embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tailgate for a vehicle body comprising:

a closure member having a generally hollow interior;

an aperture formed in the closure member;

a support mounted in the hollow interior; and a panel member having a portion thereof extending through the aperture and pivotably coupled to the vehicle body, the panel member slidably supported by the support so that the panel member pivots relative to the vehicle body causing the panel member to slide relative to the closure member within the aperture when the tailgate is moved to an open or closed position, the panel member attached to the vehicle body so as to cover at least a portion of a gap between the vehicle body and the closure member.

2. The tailgate of claim 1 wherein the closure member is attached to the vehicle body by a hinge arranged to allow the tailgate to translate away from the vehicle body when the tailgate is moved to the open position.

3. The tailgate of claim 1 wherein the aperture is formed in an inner facing side of the closure member.

4. A vehicle comprising:

a vehicle body having an aperture therein;

a closure member having a generally hollow interior and a panel aperture formed in a surface thereof;

a hinge pivotably coupling the closure member to the vehicle body, the closure member being movable between a first position substantially enclosing the body aperture and a second position allowing the aperture to be open, the hinge positioning the closure member in spaced relationship with the vehicle body; and a panel member extending through the panel aperture and pivotably coupled to the vehicle body, the panel member simultaneously pivoting relative to the vehicle body and sliding relative to the closure member in response to movement of the closure member between the first and second positions, the panel member covering a gap between the vehicle body and the closure member when the closure member is in the second position.

5. The vehicle of claim 4 wherein the hinge is arranged to allow the closure member to translate away from the vehicle body when moved to the second position.

6. The vehicle of claim 4 wherein said surface is an inner facing surface of the closure member.

* * * * *